United States Patent

Carson

[11] 4,079,960
[45] Mar. 21, 1978

[54] TOWING HITCH FOR LAWN MOWER

[76] Inventor: Raymond M. Carson, Rte. 1, Box 4, Faxon, Okla. 73540

[21] Appl. No.: 733,517

[22] Filed: Oct. 18, 1976

[51] Int. Cl.² .............................................. B60D 1/00
[52] U.S. Cl. ..................................... 280/472; 56/10.4
[58] Field of Search ........... 280/411 A, 411 B, 411 C, 280/412, 413, 462, 467, 472, 485, 457; 56/10.4, 10.2; 293/60

[56] References Cited

U.S. PATENT DOCUMENTS

| 1,923,952 | 8/1933 | Pearson | 56/10.4 |
| 3,721,074 | 3/1973 | Heth | 56/10.4 |

*Primary Examiner*—Joseph F. Peters, Jr.
*Assistant Examiner*—John A. Pekar

*Attorney, Agent, or Firm*—Clarence A. O'Brien; Harvey B. Jacobson

[57] ABSTRACT

A towing hitch having an arm arrangement including a first arm mounted on a vehicle, such as a lawn mower, to be towed and a second arm connected to the first arm and attachable to a towing tractor. Biasing the second arm toward the vehicle being towed is a resilient arrangement which causes the towing tractor and vehicle being towed to travel in parallel, but offset, paths, while a bumper assembly provided on the arm arrangement contacts obstructions, such as trees, in the path of travel of the vehicle being towed so as to change the angular relationship of the first arm and second arm against the bias of the resilient arrangement and route the vehicle being towed around the obstruction.

6 Claims, 9 Drawing Figures

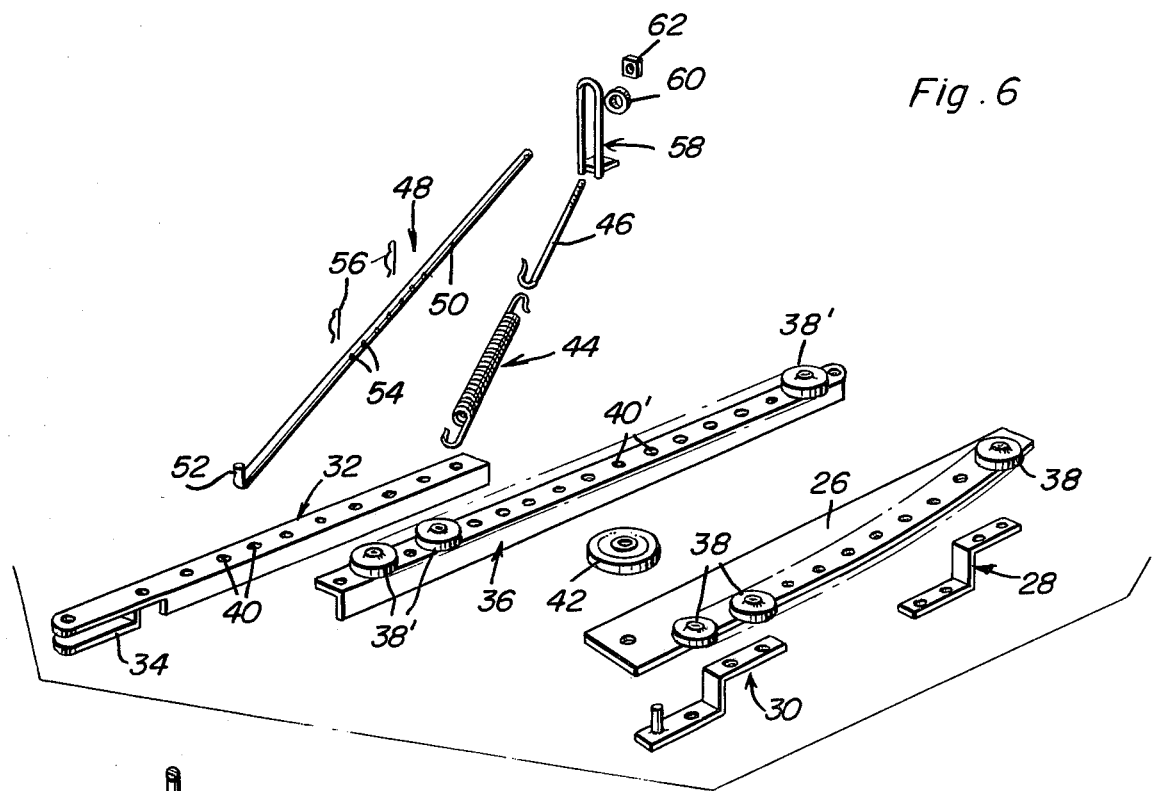
Fig. 6
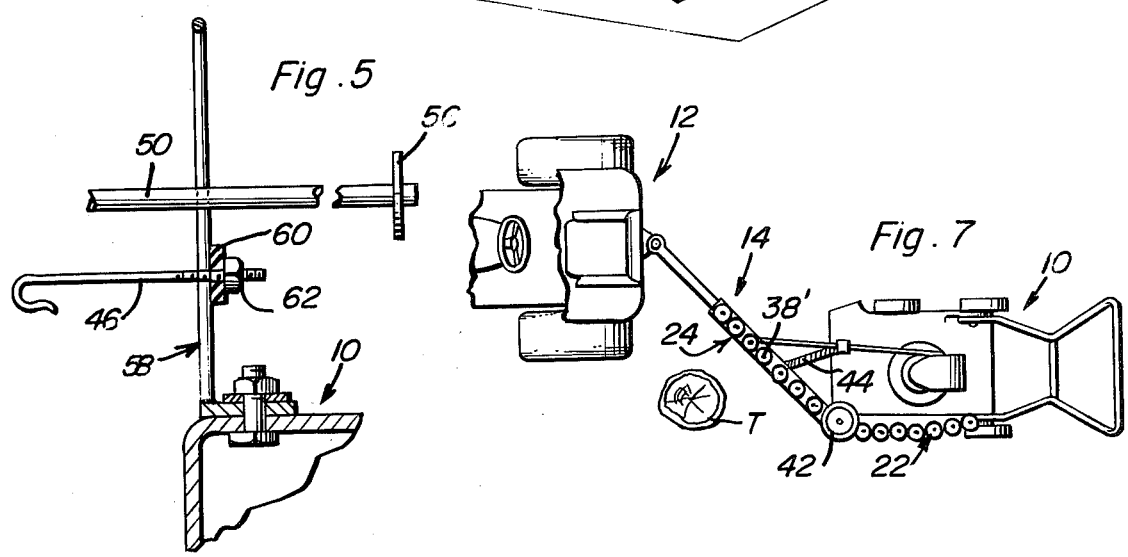
Fig. 5
Fig. 7
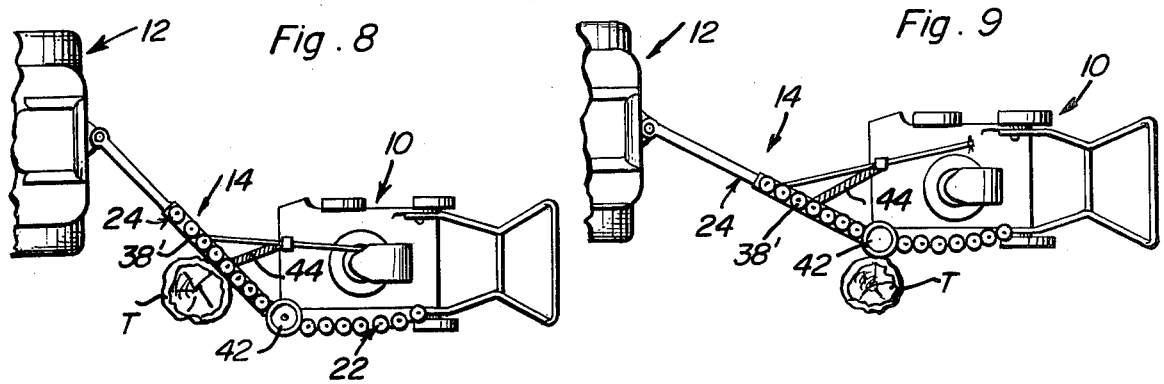
Fig. 8
Fig. 9

TOWING HITCH FOR LAWN MOWER

BACKGROUND OF THE INVENTION

1. Field of the Invention

This invention relates generally to towing hitches, and particularly to a towing hitch which permits the towing of a lawn mower behind a riding vehicle such as a garden tractor or riding lawn mower.

2. Description of the Prior Art

It is becoming an increasingly common practice by people who have a large area of grass to mow to pull a mower behind a riding mower. By having the mower being pulled traveling in a slightly different parallel path than that traveled by the riding mower, more of the grass can be mowed in a given time. Further, a conventional push-type lawn mower can frequently cut closer to trees and other obstructions than can a riding mower. A problem arises, however, when there are trees or similar obstructions placed at random in the area being mowed, inasmuch as with the usual fixed towing hitches the riding mower cannot be taken any closer to the tree or other obstruction than will permit the lawn mower being towed to pass by the obstruction.

It is generally known to mount mowers, harvesters, and the like, on tractors in such a manner that the relationship of the cutting device can be varied with respect to the tractor. Examples of prior art arrangements for this purpose can be found in U.S. Pat. Nos. 2,166,967, issued July 25, 1939 to C. R. Raney et al.; 2,838,901, issued June 17, 1958 to H. W. Davis; and 3,545,184, issued Dec. 8, 1970 to A. Liepold et al.; and 3,665,685, issued May 30, 1972 to J. Allard. A difficulty with these known mowing devices, however, is that the hitch is an integral part of the mower or harvester itself, and accordingly the hitch is not suited for connecting a lawn mower behind a riding mower or other tractor.

SUMMARY OF THE INVENTION

It is an object of the present invention to provide a towing hitch which permits a lawn, and the like, to be mowed and trimmed anywhere a riding tractor can go.

It is another object of the present invention to provide a towing hitch for towing a lawn mower behind a riding mower or other tractor wherein if two trees, and the like, are close enough together for only the tractor to pass between them, the hitch will allow the towed mower to get completely behind the tractor in order to pass between the trees.

These and other objects are achieved according to the present invention by providing a towing hitch having: an arm arrangement mountable on a vehicle to be towed and attachable to a towing tractor; a resilient arrangement connected to the arm arrangement and connectible to the vehicle to be towed for biasing the arm arrangement toward the vehicle; and a bumper assembly provided on the arm arrangement for contacting obstructions in the path of travel of the vehicle being towed and changing the angular relationship of the arm means with respect to the path of travel of the vehicle against the bias of the resilient arrangement for routing the vehicle around the obstruction.

The arm arrangement advantageously includes a first arm mountable on the vehicle and a second arm pivotally connected to the first arm and attachable to the tractor, with the resilient arrangement being connected to the second arm as well as to the vehicle. Further, the bumper assembly advantageously includes a plurality of rollers rotatably mounted on the first arm and second arm, with a roll of larger diameter than the rollers being rotatably mounted at the pivotal connection of the second arm to the first arm.

The resilient arrangement preferably includes a tension spring connectible to and extendible between the vehicle and the second arm, with a stop device included in the resilient arrangement and also connectible to the vehicle and attachable to the second arm for limiting movement of the second arm relative to the first arm.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is an enlarged, fragmentary, sectional view taken generally along the line 5—5 of FIG. 1, but with the spring removed.

FIG. 6 is an exploded, perspective view showing the towing hitch set forth in FIGS. 1 through 5.

FIGS. 7, 8, and 9 are fragmentary, schematic, top plan views showing the manner in which a towing hitch according to the present invention permits a vehicle being towed to pass around obstructions such as trees and the like.

DESCRIPTION OF THE PREFERRED EMBODIMENT

Figure 1:
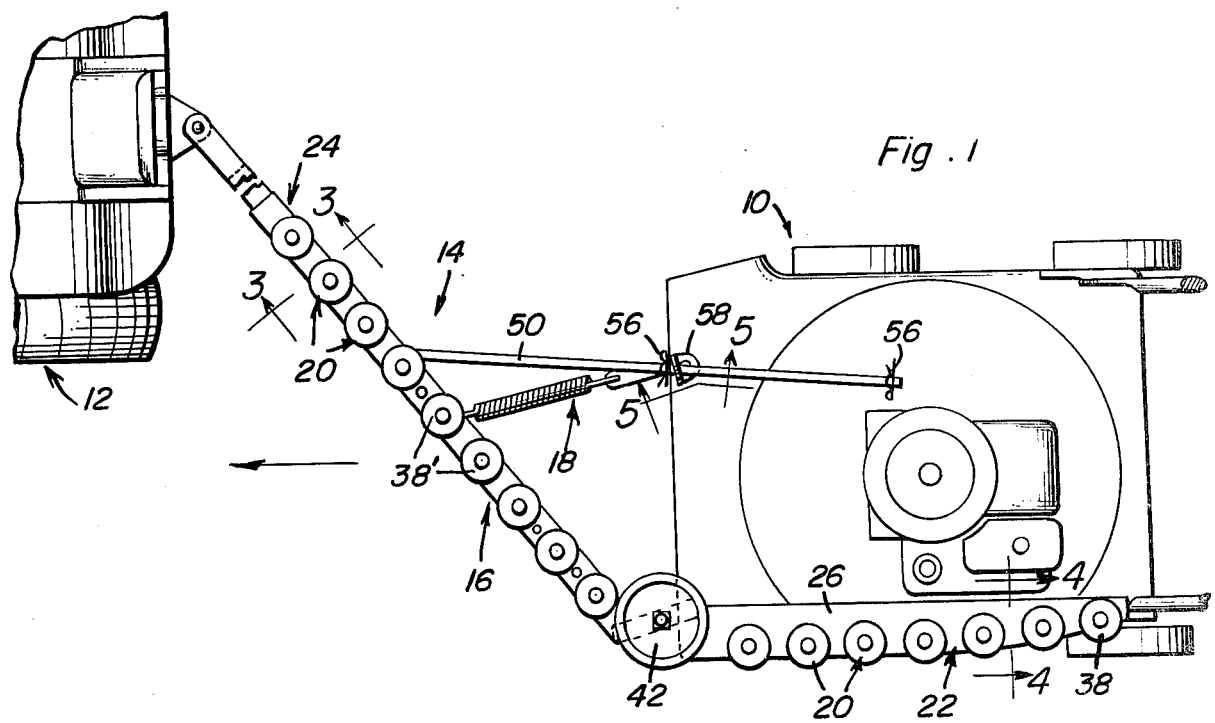
FIG. 1 is a fragmentary, top plan view showing a towing hitch according to the present invention connected to a tractor and a vehicle to be towed.
Figure 2:
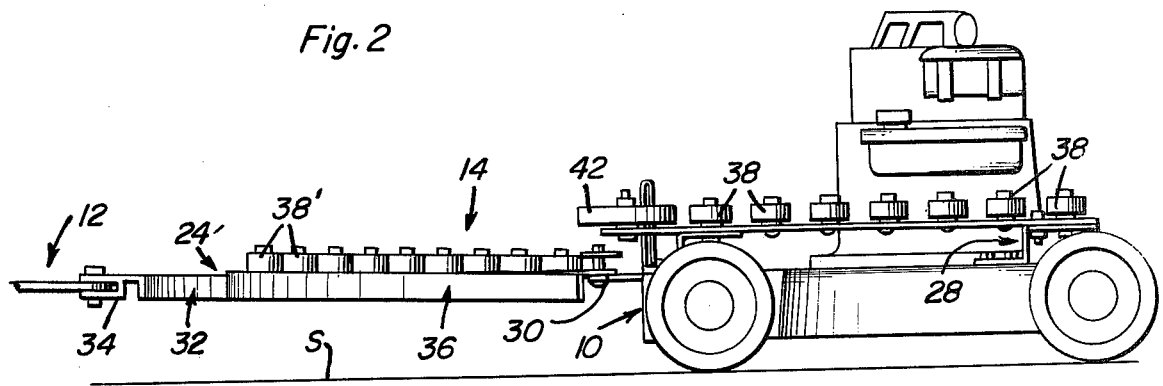
FIG. 2 is a fragmentary, side elevational view showing the towing hitch arrangement seen in FIG. 1.
Figure 3:
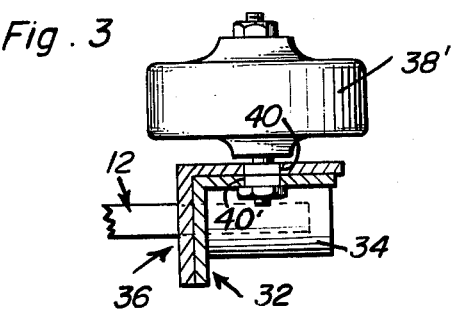
FIG. 3 is an enlarged, fragmentary, sectional view taken generally along the line 3—3 of FIG. 1.
Figure 4:
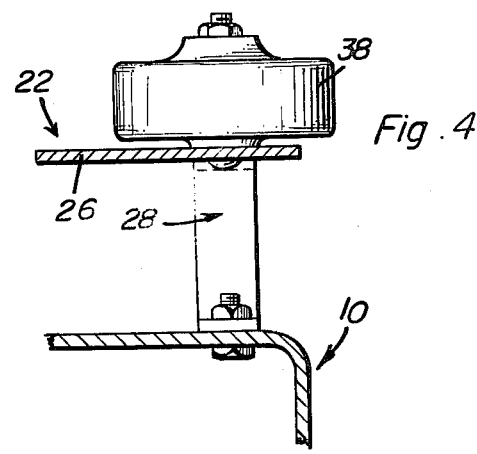
FIG. 4 is an enlarged, fragmentary, sectional view taken generally along the line 4—4 of FIG. 1.

Referring now more particularly to FIGS. 1 through 6 of the drawings, a conventional motorized push-type lawn mower 10 is illustrated as being towed behind a tractor 12, which may be a conventional riding mower, as by a towing hitch 14 according to the present invention. As can be seen from FIG. 1, mower 10 normally travels in a path parallel to, but offset from, the path of travel of tractor 12. The direction arrow in FIG. 1 indicates the general direction of travel of both mower 10 and tractor 12.

Hitch 14 includes an arm assembly 16 mountable on mower 10 and attachable to tractor 12. A resilient arrangement 18 is connected to the arm assembly 16 and connectible to mower 10 to be towed for biasing the arm assembly 16 toward mower 10, while a bumper arrangement 20 is provided on arm assembly 16 for contacting obstructions in the path of travel of mower 10 and changing the angular relationship of arm assembly 16 with respect to such path of travel in order to route mower 10 around the obstruction.

Arm assembly 16 includes a first arm 22 mounted on mower 10 so as to have a fixed relationship with respect to the towed vehicle, and a second arm 24 pivotally connected to the first arm 22 and attached to tractor 12. More specifically, arm 22 is constructed from a plate 26 affixed to the outboard side edge of the skirt of mower 10 as by the generally Z-shaped brackets 28 and 30. Bracket 30 includes a pin which facilitates mounting of arm 24 to arm 22 at the forward outboard corner of mower 10. Arm 24 is constructed from a longitudinally extending angle 32 provided with a hitch 34 at one end thereof for attachment to tractor 12 and having mounted on angle 32 in generally mating relationship a shorter length of longitudinally extending angle 36. The latter is provided with an ear at the end thereof which is spaced furthest from hitch 34 so that an opening provided in this ear will engage with the pin provided on bracket 30 and permit pivotal mounting of arm 24 with respect to arm 22. By this arrangement, it will be appreciated that arm 24 is actually arranged beneath the longitudinal extent of the plate 26 forming arm 22.

Bumper arrangement 20 includes a plurality of rollers 38 and 38' rotatably mounted on plate 26 and angle 36, respectively. Angles 32 and 36 are adjustably connected together at a predetermined length by attachment of rollers 38 to both the angles 32 and 36, with a shaft of the rollers 38' being disposed in mating holes 40 and 40' provided in angles 32 and 36. Rollers 38 are mounted on plate 26 as by means of suitable holes provided along the generally curved edge of plate 26 which extends along the outboard side of mower 10.

Bumper arrangement 20 further includes a roll 42 of larger diameter than the rollers 38 and rotatably mounted at the pivotal connection of arm 24 to arm 22. More specifically, the roll 42 is mounted on plate 42 at the front disposed end thereof in such a manner that the pivotal connection of angle 36 to the lower portion of bracket 30 is at the peripheral portion of roll 42.

Resilient arrangement 18 includes a coiled tension spring 44 connected to and extending between vehicle 10 and arm 24. A hook 46 is mounted on the skirt of mower 10 in order to receive one end of spring 44, while the other end of spring 44 may be inserted in ones of the holes 40, 40' provided in angles 32, 36 which are not being used to mount rollers 38'. That is, as can be seen from FIG. 1, a greater number of holes 40, 40' are provided in the angles 32, 36 than are needed to mount the rollers 38' in order to provide for some flexibility in the mounting of rollers 38' and the attachment of spring 44. Further, these additional holes 40, 40' may be employed to secure together the angles 32 and 36 by the use of conventional fasteners (not shown).

A stop assembly 48 forming part of the resilient arrangement 18 is also connected to vehicle 10 and attached to arm 24 for limiting movement of arm 24 relative to arm 22.

Stop assembly 48 includes a rod 50 provided with a hooked end 52 insertable into one of the set of holes 40, 40' and provided along its length with a plurality of apertures 54 for receiving pins or clips 56 in such a manner as to have the clips 56 cooperate with a generally I-shaped guide 58 mountable on the skirt of mower 10 in a conventional manner. Further, the towing hitch 14 can be made a rigid hitch by placing a clip 56 in an aperture 54 of rod 50 on either side of an adjacent guide 58. Hook 46 can also be retained on mower 10 by use of guide 58, with the threaded end of the shank of hook 46 receiving a washer 60 and cooperating nut 62 so as to prevent hook 46 from passing between the legs of guide 58 under the bias of spring 44.

OPERATION

As can be seen from FIGS. 7 through 9 of the drawings, contact of the rollers 38' of arm 24 against a tree T, and the like, will cause arm 24 to be deflected in such a manner that the angle between arms 22 and 24 is increased against the bias of spring 44 and mower 10 will be brought more into direct alignment behind the towing tractor 12. The hitch 14 also follows tractor 12 at corners better than a stiff hitch, as when it gets to a corner and tractor 12 turns the spring 44 stretches slightly allowing the towed mower 10 to make a tighter corner. Spring 44 can be connected at various points along the main bar or second arm 24 to allow for very fine adjustments.

By removing the clips 56 and unhooking the spring 44—which only takes, for example, 10 to 20 seconds—the hitch 14 can be removed from mower 10, and an operator (not shown) can trim very close around objects such as trees by merely pulling mower 10 in reverse and around the tree. This procedure is usually not necessary since the tree will be trimmed around as the tractor 12 tows mower 10. By just making a circular trip around each tree with the tractor 12 towing mower 10, the tree will usually be trimmed all around.

SUMMARY

As can be readily understood from the above description and from the drawings, a towing hitch according to the present invention permits a vehicle to be towed in areas at which obstructions are placed at random without the necessity of keeping the towed vehicle directly behind the tractor in order to permit the towed vehicle to pass between the obstructions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A towing hitch, comprising, in combination:
   (a) arm means for mounting on a vehicle to be towed and attachment to a towing tractor, the arm means including a first arm having spaced ends and mountable on the vehicle being towed and in fixed relation to a side edge of the vehicle and a second arm pivotally connected to the first arm at a one of the ends of the first arm closest to the towing tractor and pivotably attachable to the towing tractor;
   (b) resilient means connected to the second arm of the arm means and connectible to the vehicle to be towed for biasing the arm means toward the vehicle; and
   (c) bumper means provided on the arm means for contacting an obstruction in the path of travel of the vehicle and changing the angular relationship of the arm means with respect to the path of travel against the bias of the resilient means and directing the vehicle away from the obstruction.

2. A structure as defined in claim 1, wherein the bumper means includes a plurality of rollers rotatably mounted on the first arm and the second arm, and a roll of larger diameter than the rollers rotatably mounted at the pivotal connection of the second arm to the first arm.

3. A structure as defined in claim 2, wherein the resilient means includes a tension spring connected to the second arm and connectible to the vehicle, and stop means also connectible to the vehicle and attached to the second arm for limiting movement of the second arm relative to the first arm.

4. In combination with a vehicle to be towed and a towing tractor, the vehicle to be towed having a side edge outboard of the towing tractor, a towing hitch, comprising, in combination:
  (a) arm means mounted on the vehicle being towed and attached to the towing tractor;
  (b) resilient means connected to the arm means and to the vehicle being towed for biasing the arm means toward the vehicle; and
  (c) bumper means provided on the arm means for contacting an obstruction in a path of travel of the vehicle being towed and changing the angular relationship of the arm means with respect to the path of travel against the bias of the resilient means and directing the vehicle away from the obstruction, and the arm means including a first arm mounted in fixed relation along the side edge of the vehicle being towed, and a second arm pivotally connected to the first arm at an end thereof closest to the towing tractor and pivotably attached to the towing tractor, the resilient means being connected to the second arm.

5. A structure as defined in claim 4, wherein the bumper means includes a plurality of rollers rotatably mounted on the first arm and the second arm, and a roll of larger diameter than the rollers rotatably mounted at the pivotal connection of the second arm to the first arm.

6. A structure as defined in claim 5, wherein the resilient means includes a tension spring connected to and extending between the vehicle being towed and the second arm, and stop means also connected to the vehicle and attached to the second arm for limiting movement of the second arm relative to the first arm.

* * * * *